United States Patent [19]

Van House

[11] 4,071,283
[45] Jan. 31, 1978

[54] MASTER AND SLAVE BREAK BOOSTERS FOR FRONT AND REAR WHEEL BRAKES WITH WHEEL LOCK CONTROL

[75] Inventor: Robert M. Van House, Dayton, Ohio

[73] Assignee: General Motors Corporation, Detroit, Mich.

[21] Appl. No.: 690,191

[22] Filed: May 26, 1976

[51] Int. Cl.² .............................................. B60T 8/04
[52] U.S. Cl. .................................... 303/114; 60/550; 303/6 R; 303/119
[58] Field of Search ................... 303/6R, 68, 69, 114, 303/119, 6 C; 60/549, 550, 556

[56] References Cited

U.S. PATENT DOCUMENTS

| | | | |
|---|---|---|---|
| 3,038,761 | 6/1962 | Kenrick | 303/114 |
| 3,232,676 | 2/1966 | Cripe | 303/119 |
| 3,245,726 | 4/1966 | Stelzer | 60/549 X |
| 3,556,608 | 1/1971 | MacDuff et al. | 303/114 |
| 3,600,042 | 8/1971 | Cripe | 303/6 R X |
| 3,744,853 | 7/1973 | Cullen et al. | 303/114 |

Primary Examiner—Trygve M. Blix
Assistant Examiner—Edward R. Kazenske
Attorney, Agent, or Firm—D. D. McGraw

[57] ABSTRACT

A brake booster and master cylinder assembly operates the front wheels of a vehicle and a slave booster and master cylinder assembly operates the rear wheels of the vehicle. A solenoid controlled valve in a conduit connecting the variable pressure sides of the booster units normally permits free air passage. When energized for wheel lock control purposes, it blocks the flow of air between the two boosters, admitting engine vacuum to the high pressure side of the slave booster. This decreases rear brake actuating pressure under control of a logic system.

2 Claims, 1 Drawing Figure

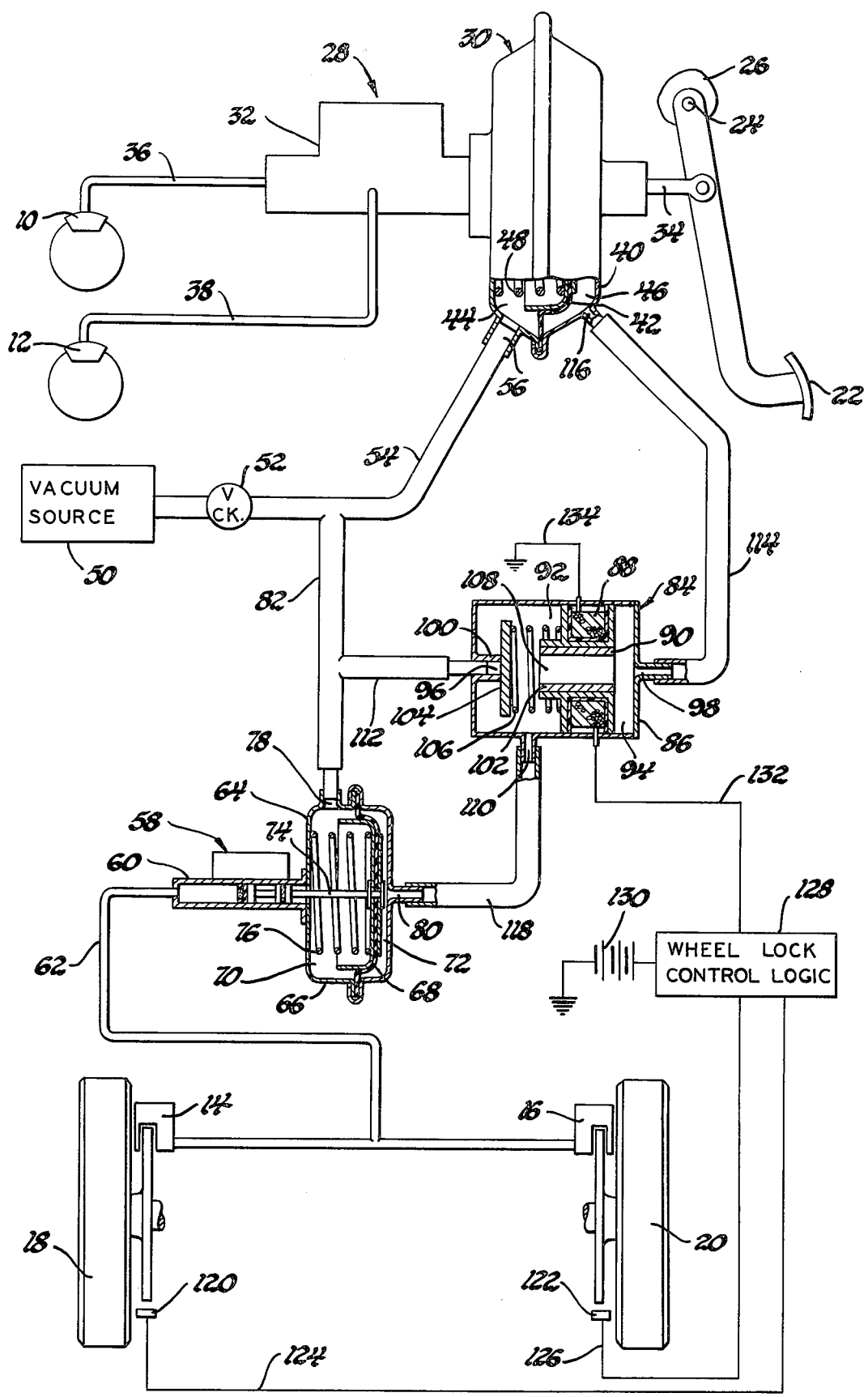

MASTER AND SLAVE BREAK BOOSTERS FOR FRONT AND REAR WHEEL BRAKES WITH WHEEL LOCK CONTROL

The invention relates to a vehicle brake system and more particularly to one in which an operator operated brake booster directly actuates a master cylinder generating pressure for the front wheel brakes. The booster has a substantially constant pressure chamber on one side of its power wall and a variable pressure chamber on the other side. A slave booster and master cylinder assembly is provided for the rear wheel brakes. The slave booster also has a substantially constant pressure chamber and a variable pressure chamber separated by a power wall. The two booster constant pressure chambers are connected to a pressure source. In the illustrated embodiment the pressure from the source is subatmospheric, commonly referred to as vacuum. The two booster variable pressure chambers are connected through a solenoid actuated control valve. The valve in its normally deenergized position maintains the pressure connection between the two variable pressure chambers. The valve is energized by an appropriate signal generated by a wheel lock control logic module when incipient rear wheel lock is sensed. Energization of the solenoid valve closes communication between the two booster variable pressure chambers and introduces the pressure from the pressure source into the variable pressure chamber of the slave booster. In the illustrated embodiment, this provides the same pressure on both sides of the slave booster power wall, the pressure being vacuum from the vacuum source. The booster therefore operates to decrease its braking actuation of its associated master cylinder, decreasing the braking effort at the rear wheel brakes. When the rear wheels begin to accelerate and no longer are in an incipient wheel lock condition, the logic module deenergizes the solenoid valve, disconnecting the vacuum source from the slave booster variable pressure chamber and reconnecting that chamber with the master booster variable pressure chamber. This causes the slave booster to again actuate its associated master cylinder and the rear wheel brakes are therefore reapplied.

IN THE DRAWING

The FIGURE is a schematic representation of a vehicle brake system embodying the invention, with parts broken away and in section.

The vehicle in which the system is installed has front wheel brakes 10 and 12 for the vehicle front wheels, and rear wheel brakes 14 and 16 for the rear wheels 18 and 20. The brake system includes a brake pedal 22 pivoted at 24 to a suitable portion 26 of the vehicle. The brake pedal is arranged for operation by the vehicle operator in the usual manner. A master brake booster and master cylinder assembly 28 includes a booster section 30 and a master cylinder section 32. A push rod 34 is suitably connected with brake pedal 22 to actuate the assembly 28 in the usual manner. The master cylinder section is of the dual pressurizing chamber type and is arranged to have one pressurizing chamber connected through conduit 36 to actuate front wheel brake 10, and the other pressurizing chamber to be connected through conduit 38 to actuate the front wheel brake 12. The booster section includes a housing 40 divided by a power wall 42 to define therein a substantially constant pressure chamber 44 and a variable pressure chamber 46. A booster power wall return spring 48 urges the power wall 42 toward the brake release position, as is usual in the art.

The system is connected to a suitable vacuum source 50. A check valve 52 is provided in a conduit 54 so that when the vacuum source 50, which may be the engine intake manifold, is not operated, the vacuum portion of the system retains the vacuum therein. Conduit 54 is connected through a port 56 to substantially constant pressure chamber 44.

A slave booster and master cylinder assembly 58 is provided for the rear wheel brakes. A master cylinder section 60 is illustrated as being of the single pressurizing chamber type and is connected by conduit 62 to actuate rear wheel brakes 14 and 16. The slave booster section 64 includes a housing 66 divided by power wall 68 into a substantially constant pressure chamber 70 and a variable pressure chamber 72. A power wall is connected by rod 74 to actuate the master cylinder section 60 in the usual manner. A power wall return spring 76 urges the power wall 68 to the brake release position. A port 78 is provided for chamber 70 and a port 80 is provided for chamber 72. A conduit 82 connects port 78 with conduit 54 between check valve 52 and the master booster port 56. Therefore pressure from vacuum source 50 is maintained in chamber 70, the pressure being the same as that maintained in chamber 46 of booster section 30.

A control valve assembly 84 includes a housing 86 containing a solenoid assembly 88. Assembly 88 includes a tubular solenoid core 90 which communicates with a chamber 92 in one part of housing 86 and a chamber 94 in another part of the housing 86 on the opposite side of solenoid assembly 88. The housing is provided with a port 96 opening into chamber 92 and a port 98 opening into chamber 94. Port 96 is formed to provide a valve seat 100 within chamber 92, and one end of solenoid core 90 is formed to provide a valve seat 102. The valve seats are in axial alignment, generally annular, and open into chamber 92 in opposition. A valve 104 is positioned in chamber 92 for movement between the seats 100 and 102 so that the valve will maintain one of the seats closed and the other of the seats open. A valve spring 106 continually urges valve 104 toward engagement with valve seat 100 and therefore tends to maintain port 96 closed. This permits port 98 to be in fluid communication with chamber 92 through the port 108 formed by tubular core 90 and opening through valve seat 102. Housing 86 has another port 110 opening into chamber 92 and so positioned that valve 104 has no opening and closing effect on it. A conduit 112 connects port 96 with conduit 82 so that vacuum from vacuum source 50 is always present at port 96 to the same extent that it is present in chambers 44 and 70. Another conduit 114 connects a port 116 opening from the master booster variable pressure chamber 46 with port 98 of the control assembly 84. When the solenoid assembly 88 is not energized, the variable pressure in chamber 46 is transmitted through port 98 to the interior of control assembly housing 86, including chamber 92. Another conduit 118 provides continuous fluid communication between control assembly port 110 and slave booster section port 80. This arrangement maintains the variable pressure chamber 72 at the same pressure as that found in the control assembly chamber 92. So long as valve 104 is seated on valve seat 100, this pressure is the same as that found in the master booster section variable pressure chamber 46, and is under control of the vehicle operator according to his operation of assembly 28 by brake pedal 22.

The rear wheels 18 and 20 are provided with wheel speed sensors 120 and 122 which are respectively connected through electrical leads 124 and 126 to the wheel lock control logic module 128. The module is schematically illustrated as receiving electrical power from a battery 130. The module output signal is generated in electrical lead 132. This lead is connected to the winding of solenoid assembly 88, which is also connected to ground through electrical lead 134.

During normal braking operation, the vehicle operator moves brake pedal 22 to actuate the master booster section 30. During such actuation, the vacuum suspended booster section is operated to permit some atmospheric pressure to be introduced into chamber 46, the amount of such pressure being in accordance with the desired braking action. The resulting differential pressure acts across power wall 42 and against the force of spring 48 to actuate the master cylinder section 32, applying the front wheel brakes 10 and 12. The pressure in chamber 46 is connected to the slave booster chamber 72 through control assembly 84, causing a similar actuation of master cylinder section 60 and rear wheel brakes 14 and 16. So long as no incipient wheel lock of the rear wheels occurs, the module 128 will not generate a signal to cause energization of solenoid assembly 88. However, during brake actuation when such a condition occurs, the module generates a signal and transmits it through electrical lead 132 to cause solenoid assembly 88 to be energized. The solenoid core 90 therefore attracts the magnetically attractive valve 104, moving the valve off of valve seat 100 to open port 96, and causing the valve to engage valve seat 102, closing port 108. This action disconnects the variable pressure chamber 46 of the master booster section 30 from the variable pressure chamber 72 of the slave booster section 64. It also causes vacuum from the vacuum source 50 to be impressed in chamber 92 and therefore transmitted through conduit 118 to variable pressure chamber 72. This decreases the pressure differential imposed in the brake actuating direction across power wall 68, and the power wall 68 therefore moves rightwardly to decrease its actuation of master cylinder section 60, permitting the rear wheels 18 and 20 to accelerate and therefore no longer have an incipient wheel lock condition. The increase in rear wheel speed of each rear wheel is sensed by sensors 120 and 122 and signals to this effect are delivered to module 128. The module then causes de-energization of solenoid assembly 88, releasing valve 104 so that the valve spring 106 moves the valve to open port 108 and close port 96. This reestablishes the earlier condition in which the pressure in chamber 46 of the master booster section 30 is again transmitted to the slave booster section chamber 72. This causes reapplication of the rear wheel brakes until the vehicle operator releases brake pedal 22 or until another rear wheel incipient wheel lock condition again causes the system to cycle.

What is claimed is:

1. A vehicle brake system having front and rear brakes with wheel lock control of the rear brakes, said system comprising:
    a source of vacuum;
    a master brake booster and master cylinder assembly operable by a vehicle operator and connected to actuate the vehicle front brakes, the booster being a vacuum suspended booster having a vacuum chamber and a variable pressure chamber and pressures therein, the pressure in the variable pressure chamber being controlled during assembly actuation in accordance with operator operation of the booster;
    a slave brake booster and master cylinder assembly connected to actuate the vehicle rear brakes, the slave booster being a vacuum suspended booster having a vacuum chamber and a variable pressure chamber and being capable of delivering a boost force to the slave master cylinder;
    first conduit means connecting said master brake booster vacuum chamber and said slave brake booster vacuum chamber with said vacuum source;
    second conduit means having a solenoid operated valve therein which when de-energized connects said master brake booster variable pressure chamber and said slave brake booster variable pressure chamber, said solenoid operated valve when energized disconnecting the variable pressure chambers and connecting said slave brake booster variable pressure chamber with said first conduit means to impose vacuum therein independently of the operation of said master brake booster and thereby reduce the braking action of the rear brakes by reducing the boost force of said slave brake booster;
    and wheel lock control logic and incipient wheel lock sensing means for the vehicle rear brakes connected to energize and de-energize said solenoid operated valve, thereby selectively cycling said valve to generate a pressure in said slave brake booster variable pressure chamber from vacuum and the variable pressure in said master brake booster variable pressure chamber, said pressure so generated causing a lesser pressure differential actuating said slave brake booster than the pressure differential actuating said master brake booster and tending to prevent rear wheel lock due to lesser brake energization by said slave brake booster and master cylinder assembly.

2. A vehicle brake system comprising:
    a first vehicle operator controlled and pressure actuated brake booster for a first set of wheel brakes and having a pair of pressure chambers, one chamber being at a substantially constant pressure and the other chamber being subject to a variable control pressure;
    a second pressure actuated brake booster for a second set of wheel brakes and having a pair of pressue chambers, one chamber being at a substantially constant pressure and the other chamber being subject to a variable control pressure;
    first and second conduit means, said first conduit means normally pressure connecting said substantially constant pressure chambers of said first and second boosters and said second conduit means normally pressure connecting said variable control pressure chambers of said first and second boosters to provide slave operation of said second booster in accordance with vehicle operator controlled actuation of said first booster;
    control means in said conduit means, said control means including a control valve having a normally open pressure inlet and an open pressure outlet and a normally closed pressure inlet, said normally open pressure inlet and outlet being connected in said second conduit means fluidly intermediate said variable control pressure chambers and said normally closed pressure inlet being fluid connected to said first conduit means fluidly intermediate said substantially constant pressure chambers, said valve being movable to open said closed pressure inlet and close said open pressure inlet, thereby selectively connecting the second booster pair of pressure chambers in fluid communication with each other while disconnecting said first booster variable control pressure chamber from second booster variable control pressure chamber to deactuate said second booster;

and a wheel lock control logic connected to operate said control means when incipient wheel lock exists at the wheels braked by the second set of wheel brakes to deactuate said second booster and selectively cycle said valve to generate a variable pressure in said second booster variable control pressure chamber from pressures in said first booster pressure chambers.

* * * * *